J. C. THEBERATH.
VEHICLE WHEEL RIM.
APPLICATION FILED APR. 9, 1919.

1,415,963.

Patented May 16, 1922.

Inventor
Joseph C. Theberath

By *Bm Kent*

Attorney

UNITED STATES PATENT OFFICE.

JOSEPH C. THEBERATH, OF CLEVELAND, OHIO, ASSIGNOR TO THE STANDARD PARTS COMPANY, OF CLEVELAND, OHIO, A CORPORATION OF OHIO.

VEHICLE WHEEL RIM.

1,415,963.  Specification of Letters Patent.  Patented May 16, 1922.

Application filed April 9, 1919.  Serial No. 288,803.

*To all whom it may concern:*

Be it known that I, JOSEPH C. THEBERATH, a citizen of the United States, and a resident of Cleveland, county of Cuyahoga, State of Ohio, have invented certain new and useful Improvements in Vehicle Wheel Rims, of which the following is a specification.

This invention applies to so-called quick-detachable rims for pneumatic tires, consisting of a rim proper and a flange ring which is made detachable, to facilitate placing a tire on or removing it from the rim; and more particularly to rims of that type in which the side flange is transversely split to permit it to be sprung sufficiently to be placed on or removed from its position on the rim proper.

The object of this invention is to provide a structure in which the parts are capable of cheap manufacture and the flange ring will be effectively held in place on the rim and the ends effectively held in proper position.

Other objects and features of novelty will be apparent from the following specification, taken in connection with the accompanying drawings, in which.

Figure 1:
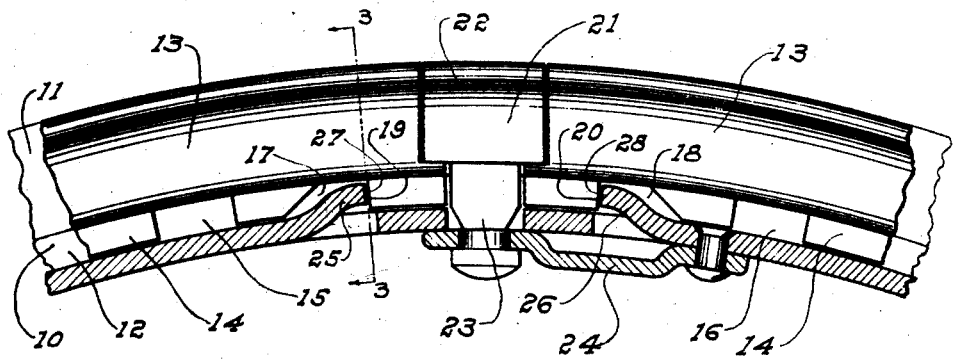
Figure 1 is a fragmental side elevation of a portion of a flange ring, showing the vehicle wheel rim in vertical section.
Figure 2:
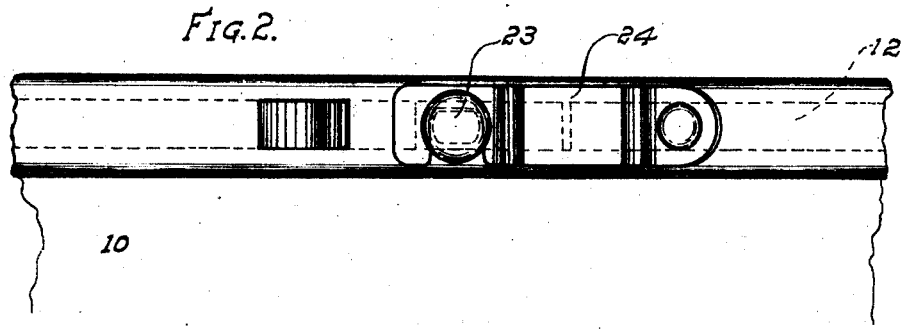
Figure 2 is a fragmental bottom plan view of the structure shown in Figure 1
Figure 3:
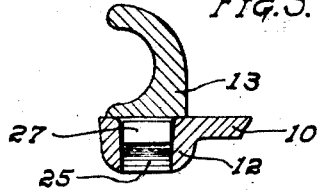
Figure 3 is a partial transverse section on the line 3—3 of Figure 1.

The rim 10 is provided on one edge with side flange 11 for holding the tire, and the other edge is formed with a circumferential groove or channel 12 in which the flange ring 13, for holding the other side of the tire, is adapted to be seated. The flange ring 13 is formed with its inner contour similar in cross-section to the side flange 11, and has a base 14 which fits into the groove 12, and is notched, as shown at 15 and 16, so that a screw driver or other implement may be inserted, to spring the ends of the ring outwardly, when it is desired to remove it from the rim.

The base 14 is also notched, as shown at 17 and 18, to form abutments 19 and 20, the function of which will be described later. Between the ends of the flange ring 13 a filler 21 is positioned, being formed with a body 22, conforming to the shape of the flange ring, and a stem 23 which extends inwardly through the bottom of the groove 12 and is adapted to be held in place by the pivoted locking member 24. The filler 21 engages the ends of the ring 13 and effectively holds them in the groove 12.

The present invention relates to means for preventing the ends of the ring 13 from spreading or moving around the rim in the groove 12, as such motion would allow the ring to free itself from the locking mechanism. To attain this end, the integral lugs 25 and 26 are formed, by stamping up the metal from the bottom of the groove 12. These lugs incline outwardly into the groove and toward each other, the metal being cut through at the adjacent ends, to form abrupt opposing faces 27 and 28 for engagement with the abutments 19 and 20. By reason of this integral construction of the lugs, the ends of the flange ring are effectively held against rotation on the rim, and a cheap, substantial structure is obtained.

Having thus described my invention, what I claim is:

1. The combination with a wheel rim of a split side ring removably mounted on said rim, and means for locking said ring to said rim, said ring having opposed abutments, and said rim having integral lugs stamped-up therefrom, the juxtaposed edges of which are severed from the rim to form shoulders which engage said abutments to hold said ring against circumferential displacement.

2. The combination with a wheel rim, of a flange ring removably mounted on said rim, means for securing said ring on said rim, said ring comprising an abutment, and an integral stamped-up lug on said rim having a transverse edge severed from the metal of the rim and engaging said abutment to hold said ring against circumferential displacement.

3. The combination of a wheel rim having a circumferential groove at one edge thereof, a flange ring adapted to seat in said groove, means for securing said ring on said rim and an integral stamped-up lug extending outwardly from the bottom of said groove with a transverse edge thereof severed from the body of the rim, said ring having an abutment thereon engaging the edge of said lug and held thereby from circumferential displacement.

4. As an article of manufacture, a vehicle wheel rim having a circumferential groove near one edge thereof and integral stamped-up lugs formed in said groove and inclined outwardly and circumferentially of the rim.

5. As an article of manufacture, a vehicle wheel rim having a circumferential groove and integral lugs stamped-up from the bottom of said groove and inclined radially outwardly and in opposite directions circumferentially.

In testimony whereof I affix my signature.

JOSEPH C. THEBERATH.